United States Patent
Kang et al.

(10) Patent No.: US 9,350,572 B1
(45) Date of Patent: May 24, 2016

(54) APPARATUS FOR CLOCK AND DATA RECOVERY

(71) Applicants: GLOBAL UNICHIP CORPORATION, Hsinchu (TW); TAIWAN SEMICONDUCTOR MANUFACTURING CO., LTD., Hsinchu (TW)

(72) Inventors: Wen-Juh Kang, Tainan (TW); Jeng-Hung Tsai, Santa Clara, CA (US); Chen-Yang Pan, Taipei (TW)

(73) Assignees: GLOBAL UNICHIP CORPORATION, Hsinchu (TW); TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 14/934,161

(22) Filed: Nov. 6, 2015

(51) Int. Cl.
*H03H 7/30* (2006.01)
*H04L 25/03* (2006.01)
*H04L 7/00* (2006.01)

(52) U.S. Cl.
CPC ........ *H04L 25/03019* (2013.01); *H04L 7/0008* (2013.01); *H04L 7/0054* (2013.01)

(58) Field of Classification Search
CPC .............. H04L 25/03057; H04L 7/033; H04L 25/03019; H04L 7/0054; H04L 7/0008; H04L 2025/03636; H04L 25/03885; H04L 2025/0349; H04L 25/067; H04L 25/03076; H04L 5/12; H03L 7/0814; H03L 17/04
USPC .......... 375/229, 232–233, 346, 350; 708/300, 708/322–323
See application file for complete search history.

(56) References Cited

U.S. PATENT DOCUMENTS

| | | | |
|---|---|---|---|
| 7,177,378 B2 | 2/2007 | Baldemair et al. | |
| 7,317,755 B2 * | 1/2008 | Yang | H04L 5/12 375/229 |
| 8,401,064 B1 * | 3/2013 | Lin | H04L 25/03267 375/229 |
| 8,416,846 B1 * | 4/2013 | Lin | H04L 25/03057 375/229 |
| 8,588,290 B2 | 11/2013 | Zhong | |
| 8,599,909 B2 * | 12/2013 | Doblar | H04L 25/03057 375/224 |
| 2005/0254569 A1 | 11/2005 | Momtaz | |
| 2007/0258517 A1 * | 11/2007 | Rollings | H04L 25/03057 375/233 |
| 2007/0280343 A1 | 12/2007 | Bau et al. | |
| 2010/0080282 A1 | 4/2010 | Zhong et al. | |
| 2012/0027074 A1 * | 2/2012 | Raghavan | H04L 25/03057 375/233 |
| 2012/0155530 A1 | 6/2012 | Zhong | |

(Continued)

*Primary Examiner* — Khanh C Tran
(74) *Attorney, Agent, or Firm* — CKC & Partners Co., Ltd.

(57) ABSTRACT

An apparatus is provided. A first adder generates a first superposed signal in response to a first feedback equalization signal and an input signal. A second adder generates a second superposed signal in response to a second feedback equalization signal and the first superposed signal. An edge slicer generates an edge signal by slicing the first superposed signal. A data slicer generates a data signal by slicing the second superposed signal. An error slicer generates an error signal by slicing the second superposed signal. A CDR circuit generates a first and second clock signal in response to the data signal and the edge signal. An adaptive filter generates the reference signal and equalizer coefficients in response to data signal and the error signal. An equalizing unit generates the first feedback equalization signal and the second feedback equalization signal in response to the data signal and the equalizer coefficients.

20 Claims, 9 Drawing Sheets

(56) References Cited

U.S. PATENT DOCUMENTS

| | | | |
|---|---|---|---|
| 2012/0236925 A1* | 9/2012 | Zhong | H04L 25/03076 375/233 |
| 2012/0257652 A1 | 10/2012 | Malipatil et al. | |
| 2013/0230093 A1* | 9/2013 | Aziz | H04L 25/03057 375/233 |
| 2014/0169440 A1 | 6/2014 | Kotagiri et al. | |
| 2014/0258951 A1 | 9/2014 | Danti et al. | |

* cited by examiner

APPARATUS FOR CLOCK AND DATA RECOVERY

BACKGROUND

1. Field of the Invention

The present invention relates to clock and data recovery, and more particularly to an apparatus for clock and data recovery.

2. Description of Related Art

An electronic high-speed transmission system, such as a wired communication system or a wireless communication system, can be modeled as a transmission system that includes a transmitter, a receiver and a transmission channel. In such a transmission system, the transmitter generates a transmission signal according to a clock signal, and transmits the transmission signal to the receiver through the transmission channel.

However, characteristics of the transmission channel impacts quality of signal transmission. For example, when the transmitter transmits a transmission signal of a square waveform to the receiver, the receiver will receive a waveform with slowly rising and falling edges, instead of a square waveform with sharp rising and falling edges. In the waveform received by the receiver, the slowly rising portion is referred to as a pre-cursor, the peak of slowly rising forms a main cursor, and the slowly falling portion after the peak is referred to as a post-cursor. Such signal distortion will cause ISI (inter-symbol interference) and degrade the quality of signal transmission, e.g., increase the bit error rate (BER).

To compensate impacts of the transmission channel, the receiver is equipped with equalization mechanism. For example, when the receiver receives the incoming signal from the channel, the receiver equalizes the received signal in response to equalizer coefficients and uses a clock and data recovery (CDR) circuit to generate a recovered clock signal that is synchronized with the received data. As such, the impacts of the transmission channel may be removed.

SUMMARY

The objective of the present invention is to provide an apparatus for clock and data recovery. By utilizing the apparatus of the present invention, the influences to edge detection and/or phase error estimation due to phase shift induced by equalizer coefficients can be improved.

One aspect of the present invention is to provide an apparatus for clock and data recovery. The apparatus includes a first adder, a second adder, an edge slicer, a data slicer, an error slicer, a clock and data recovery circuit, an adaptive filter and an equalizing unit. The first adder is configured to generate a first superposed signal in response to a first feedback equalization signal and an input signal. The second adder is configured to generate a second superposed signal in response to a second feedback equalization signal and the first superposed signal. The edge slicer is configured to generate an edge signal by slicing the first superposed signal according to a first clock signal. The data slicer is configured to generate a data signal by slicing the second superposed signal according to a second clock signal. The error slicer is configured to generate an error signal by slicing the second superposed signal according to the second clock signal and a reference signal. The clock and data recovery circuit is configured to generate the first clock signal and the second clock signal in response to the data signal and the edge signal. The adaptive filter is configured to generate the reference signal and a set of equalizer coefficients in response to the data signal and the error signal. The equalizing unit is configured to generate the first feedback equalization signal and the second feedback equalization signal in response to the data signal and the set of equalizer coefficients.

In one or more embodiments, the equalizing unit is a decision feedback equalizer (DFE).

In one or more embodiments, the set of equalizer coefficients includes first equalizer coefficients and a second equalizer coefficient. The first equalizer coefficients are associated with the first feedback equalization signal, and the second equalizer coefficient is associated with the second feedback equalization signal.

In one or more embodiments, the second equalizer coefficient is closest to a main cursor of the second superposed signal among the set of equalizer coefficients and is greater than each of the first equalizer coefficients.

In one or more embodiments, the equalizing unit includes a first DFE and a second DFE. The first DFE is configured to generate the first feedback equalization signal in response to the data signal and the first equalizer coefficients, and the second DFE is configured to generate the second feedback equalization signal in response to the data signal and the second equalizer coefficient.

In one or more embodiments, the first clock signal and the second clock signal are substantially inverted.

In one or more embodiments, the apparatus further includes a continuous time linear equalizer (CTLE) coupled to the first adder for equalizing the input signal received from a transmission channel.

In one or more embodiments, the adaptive filter is configured to dynamically adjust the set of equalizer coefficients in response to the data signal and the error signal.

In one or more embodiments, the clock and data recovery circuit includes a bang-bang phase detector. The bang-bang phase detector is configured to generate a phase update information in response to the data signal and the edge signal, and phases of the first clock signal and the second clock signal are correspondingly adjusted in response to the phase update information.

In one or more embodiments, the adaptive filter is a least mean square (LMS) based adaptive filter.

Another aspect of the present invention is to provide an apparatus for clock and data recovery. The apparatus includes a first adder, a second adder, an first error slicer, a data slicer, a second error slicer, a clock and data recovery circuit, an adaptive filter and an equalizing unit. The first adder is configured to generate a first superposed signal in response to a first feedback equalization signal and an input signal. The second adder is configured to generate a second superposed signal in response to a second feedback equalization signal and the first superposed signal. The first error slicer is configured to generate a first error signal by slicing the first superposed signal according to a clock signal and a first reference signal. The data slicer is configured to generate a data signal by slicing the second superposed signal according to the clock signal. The second error slicer is configured to generate a second error signal by slicing the second superposed signal according to the clock signal and a second reference signal. The clock and data recovery circuit configured to generate the clock signal in response to the data signal and the first error signal. The adaptive filter configured to generate the second reference signal and a set of equalizer coefficients in response to data signal and the second error signal. The equalizing unit configured to generate the first feedback equalization signal and the second feedback equalization signal in response to the data signal and the set of equalizer coefficients.

In one or more embodiments, the equalizing unit is a DFE.

In one or more embodiments, the set of equalizer coefficients includes first equalizer coefficients and a second equalizer coefficient. The first equalizer coefficients are associated with the first feedback equalization signal, and the second equalizer coefficient is associated with the second feedback equalization signal.

In one or more embodiments, the second equalizer coefficient is closest to a main cursor of the second superposed signal among the set of equalizer coefficients and is greater than each of the first equalizer coefficients.

In one or more embodiments, the equalizing unit comprises a first DFE and a second DFE. The first DFE is configured to generate the first feedback equalization signal in response to the data signal and the first equalizer coefficients, and the second DFE is configured to generate the second feedback equalization signal in response to the data signal and the second equalizer coefficient.

In one or more embodiments, the apparatus further includes a CTLE coupled to the first adder for equalizing the input signal received from a transmission channel.

In one or more embodiments, the adaptive filter is configured to dynamically adjust the second reference signal in response to data signal and the second error signal.

In one or more embodiments, the adaptive filter is configured to dynamically adjust the set of equalizer coefficients in response to the data signal and the second error signal.

In one or more embodiments, the clock and data recovery circuit includes a Mueller-Muller phase detector. The Mueller-Muller phase detector is configured to generate a phase update information in response to the data signal and the first error signal, and a phase of the clock signal is correspondingly adjusted in response to the phase update information.

In one or more embodiments, the adaptive filter is a LMS based adaptive filter.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings.

DETAILED DESCRIPTION

The detailed explanation of the present invention is described as following. The described preferred embodiments are presented for purposes of illustrations and description, and they are not intended to limit the scope of the present invention.

Terms concerning electrical communications, such as "coupled," refer to a relationship wherein nodes communicate with one another either directly or indirectly through intervening structure(s), component(s) or element(s), unless otherwise stated or necessary to the operation described.

Figure 1:
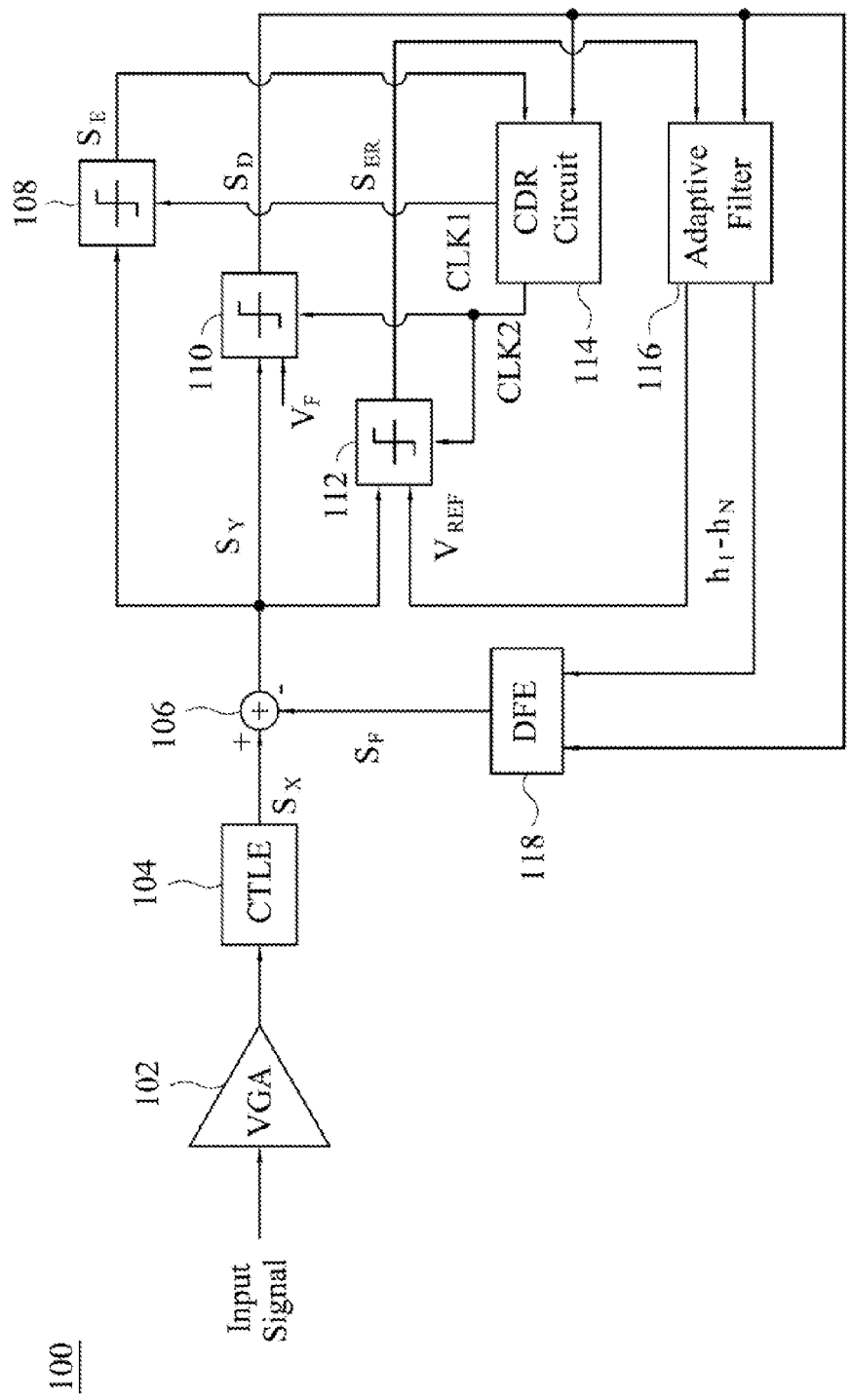
FIG. 1 is a schematic circuit diagram illustrating an apparatus for clock and data recovery.

Referring to FIG. 1, which is a schematic circuit diagram illustrating an apparatus 100 for clock and data recovery. The apparatus 100 is at a receiver of a transmission system. As shown in FIG. 1, the apparatus 100 includes a variable gain amplifier (VGA) 102, a continuous time linear equalizer (CTLE) 104, an adder 106, an edge slicer 108, a data slicer 110, an error slicer 112, a clock and data recovery (CDR) circuit 114, an adaptive filter 116 and an equalizing unit 118.

The VGA 102 is configured to receive and amplify an input signal from a transmission channel. In particular, the VGA 102 amplifies the input signal according to a gain factor that is variable. The CTLE 104 is coupled to the output of the VGA 102 and is configured to equalize the input signal. In particular, the CTLE 104 is configured to increase the magnitude of the high-frequency components of the input signal.

The adder 106 is coupled to the output of the CTLE 104 and is configured to generate a superposed signal $S_Y$ in response to a feedback equalization signal $S_F$ generated from the equalizing unit 118 and the equalized input signal $S_X$ generated from the CTLE 104. The adder 106 includes a positive input, a negative input and an output, where the positive input is configured to receive the input signal $S_X$, and the negative input is configured to receive the feedback equalization signal $S_F$. The adder 106 generates and outputs the superposed signal $S_Y$ by subtracting the feedback equalization signal $S_F$ from the input signal $S_X$.

The edge slicer 108 is coupled to the output of the adder 106 and is configured to generate an edge signal $S_E$ by slicing the superposed signal $S_Y$ according to a first clock signal CLK1. The edge slicer 108 detects edges of the superposed signal $S_Y$ and samples the superposed signal $S_Y$ at the transition timing of the first clock signal CLK1 so as to generate the edge signal $S_E$.

The data slicer 110 is coupled to the output of the adder 106 and is configured to generate a data signal $S_D$ by slicing the superposed signal $S_Y$ according to a second clock signal CLK2 and a fixed reference signal $V_F$ (e.g. 0V). The data slicer 110 samples the superposed signal $S_Y$, determines logic values of samples, and generates a data signal $S_D$ accordingly. For illustration, the data slicer 110 compares each sample of the superposed signal $S_Y$ with a middle level to determine whether each sample of the superposed signal $S_Y$ is greater than the middle level. If the sample of the superposed signal $S_Y$ is greater than the middle level, the data slicer 110 sets the sample of the superposed signal $S_Y$ equal to logic 1; otherwise, the data slicer 110 sets the sample of the superposed signal $S_Y$ equal to logic 0.

The error slicer 112 is coupled to the output of the adder 106 and is configured to generate an error signal $S_{ER}$ by slicing the superposed signal $S_Y$ according to the second clock signal CLK2 and a reference signal $V_{REF}$. For illustration, if a sample of the superposed signal $S_Y$ is determined to be logic 1, the error slicer 112 sets the sample of the superposed signal $S_Y$ equal to +1 or −1 to reflect whether the sample of the superposed signal $S_Y$ is greater or less than the level of the reference signal $V_{REF}$.

The CDR circuit 114 is coupled to the edge slicer 108 and the data slicer 110 and is configured to generate the first clock signal CLK1 and the second clock signal CLK2 in response to the data signal $S_D$ and the edge signal $S_E$. The CDR circuit 114 may include a bang-bang phase detector (also called as the Alexander phase detector) configured to receive the data signal $S_D$ and the edge signal $S_E$ so as to generate the phase update information for correspondingly adjusting the first clock signal CLK1 and the second clock signal CLK2.

The adaptive filter 116 is coupled to the data slicer 110 and the error slicer 112 and is configured to generate the reference signal $V_{REF}$ and a set of equalizer coefficients $h_1$-$h_N$ in response to the data signal $S_D$ and the error signal $S_{ER}$. The adaptive filter 116 may be implemented as a number of adaptation loops configured to determine the equalizer coefficients $h_1$-$h_N$. In addition, the adaptive filter 116 may dynamically adjust the reference signal $V_{REF}$ and the equalizer coefficients $h_1$-$h_N$. In some embodiments, the adaptive filter 116 is a least mean square (LMS) based adaptive filter.

The equalizing unit 118 is coupled to the data slicer 110 and the adaptive filter 116 and is configured to generate the feedback equalization signal $S_F$ in response to the data signal $S_D$ and the equalizer coefficients $h_1$-$h_N$, in order to annihilate post-cursor of the input signal $S_X$. The equalizing unit 118 may be a decision feedback equalizer (DFE), for example, and the relationship between the feedback equalization signal $S_F$, the data signal $S_D$ and the equalizer coefficients h-$h_N$ is expressed as Equation (1):

$$S_F[k] = \sum_{i=1}^{N} h_i \cdot S_D[k-i] \quad (1)$$

where [k−i] denotes the i-th delayed sample of the signal $S_D[k]$. Therefore, the relationship between the superposed signal $S_Y$, the feedback equalization signal $S_F$ and the input signal $S_X$ is expressed as Equation (2):

$$S_Y[k] = S_X[k] - S_F[k] = S_X[k] - \sum_{i=1}^{N} h_i \cdot S_D[k-i] \quad (2)$$

Figure 2:
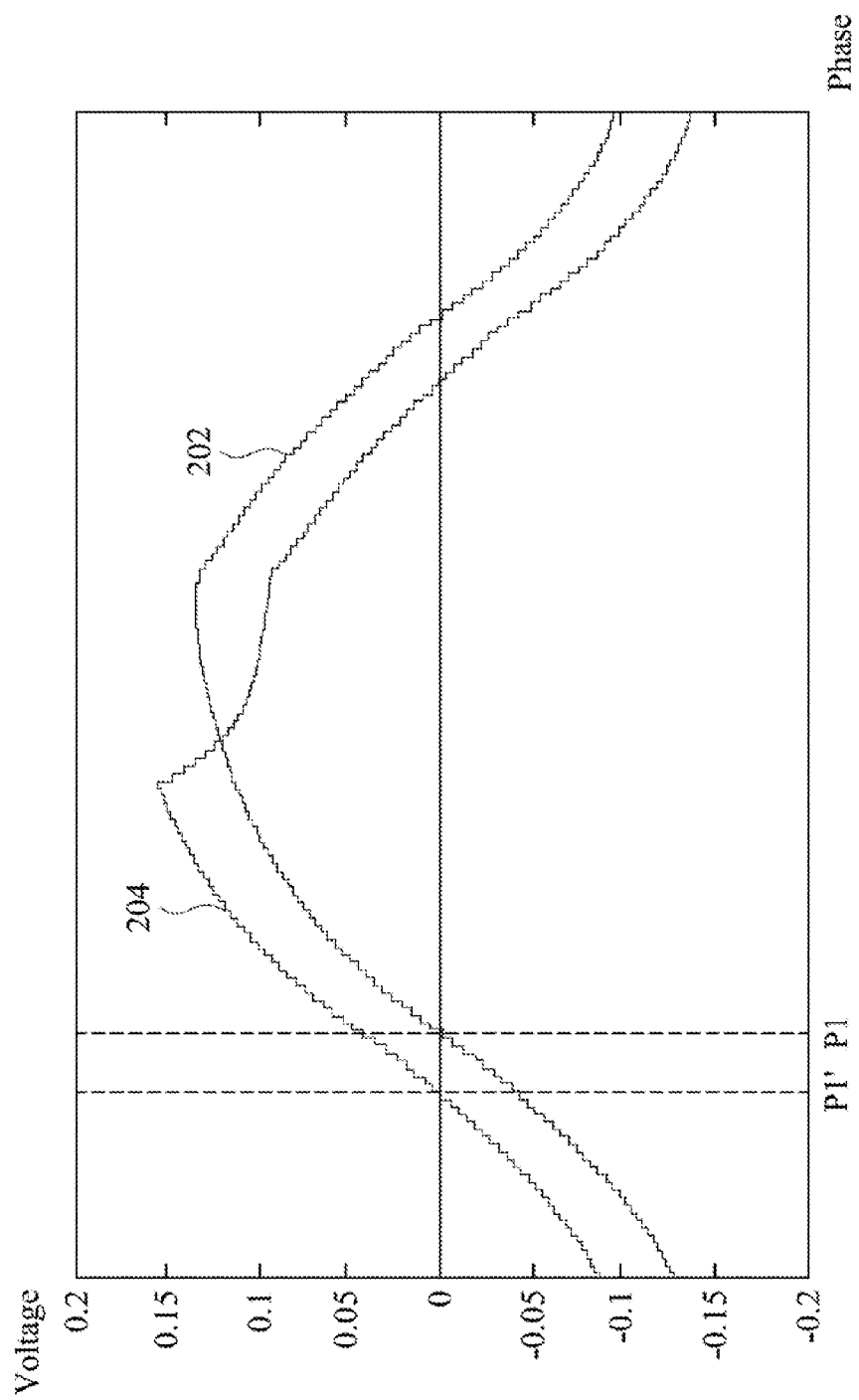
FIG. 2 schematically shows the impact of the greatest equalizer coefficient affecting the phase of the superposed signal in FIG. 1 upon zero crossings if the greatest equalizer coefficient is not added at an improper time.

FIG. 2 schematically shows the impact of the greatest equalizer coefficient (i.e., the equalizer coefficient $h_1$ that is closest to a main cursor of the superposed signal $S_Y$ among the equalizer coefficients $h_1$-$h_N$) affecting the phase of the superposed signal $S_Y$ in FIG. 1 upon zero crossings if the greatest equalizer coefficient is not added at an improper time. This coefficient has the most significant effect on zero crossing since the signs of two adjacent bits are opposite at data transition and its value will alter the position of zero crossing or original signal level. In FIG. 2, the curve 202 denotes the relationship between the voltage value of a superposed signal $S_Y$ without the equalizer coefficient $h_1$ and the phase, and the curve 204 denotes the relationship between the voltage value of a superposed signal $S_Y$ with the equalizer coefficient $h_1$ and the phase. As shown in FIG. 2, the phase transition (at a zero crossing point) of the superposed signal $S_Y$ in the rising stage is at the phase P1, and the phase transition of the edge signal $S_E$ in the rising stage is at the phase P1'. A significant phase shift exists between the phase P1 and the phase P1', thus influencing edge sampling of the edge slicer 108.

Figure 3:
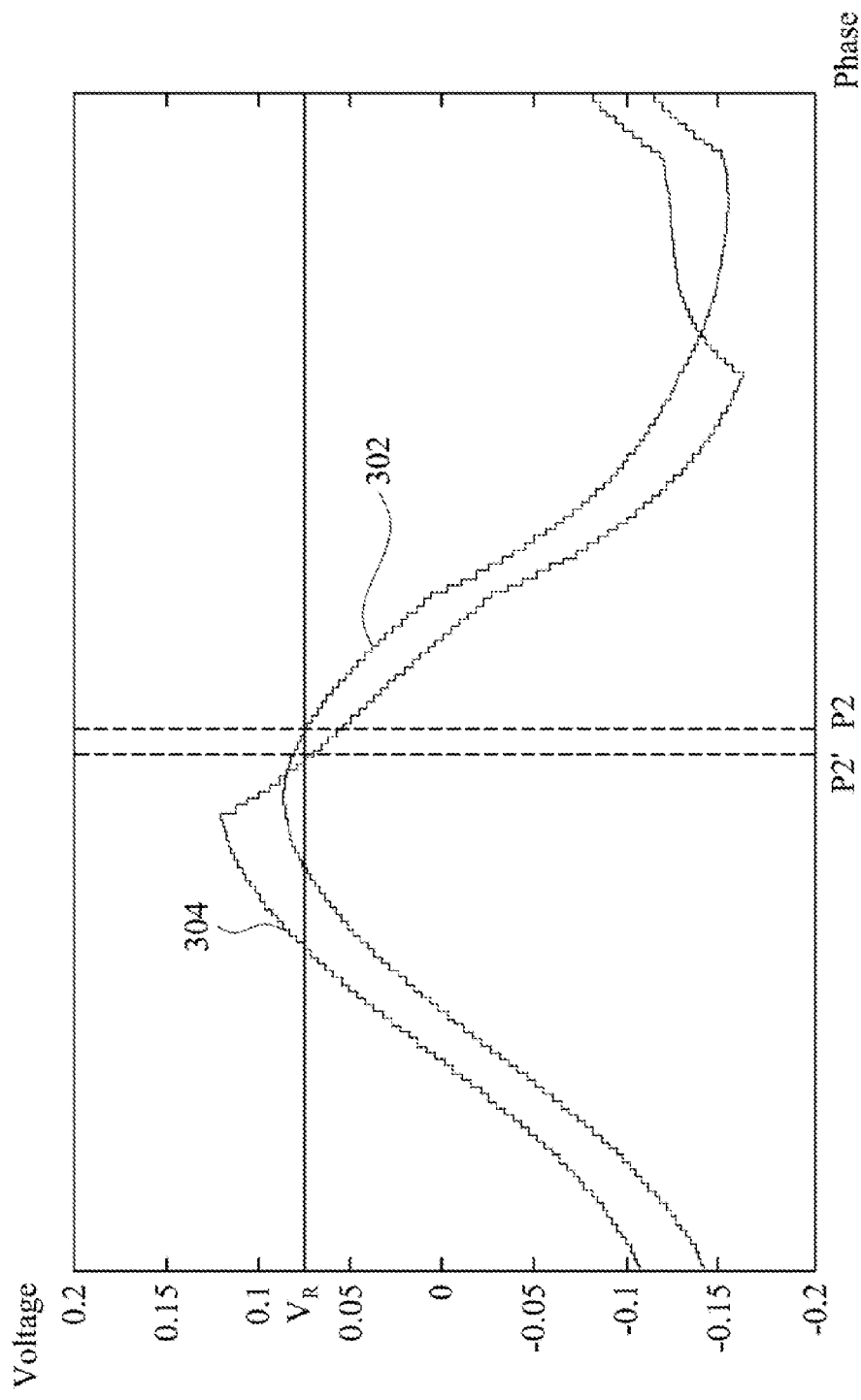
FIG. 3 schematically shows the impact of the greatest equalizer coefficient affecting the signal level of the superposed signal in FIG. 1.

FIG. 3 schematically shows the impact of the greatest equalizer coefficient affecting the signal level. In FIG. 3, the curve 302 denotes the relationship between the voltage value of a superposed signal $S_Y$ without the equalizer coefficient $h_1$ and the phase, and the curve 304 denotes the relationship between the voltage value of a superposed signal $S_Y$ with the equalizer coefficient $h_1$ and the phase. As shown in FIG. 3, the sampling phase (at the voltage level of a reference signal $V_R$) of the superposed signal $S_Y$ in the falling stage is at the phase P2, the phase transition of the edge signal $S_E$ in the falling stage is at the phase P2'. A significant phase shift exists between the phase P2 and the phase P2', thus influencing the signal level of an error signal for phase error estimation.

Figure 4A:
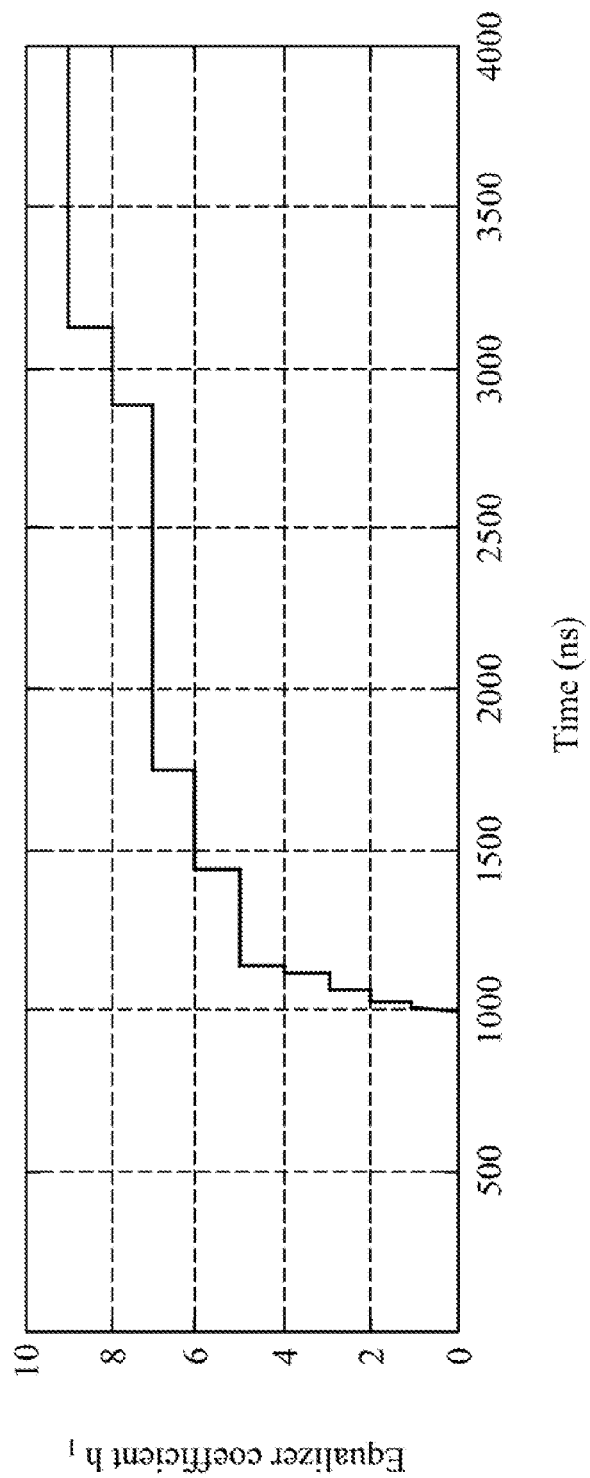
FIG. 4A schematically shows the greatest equalizer coefficient of the apparatus in FIG. 1 versus time.
Figure 4B:
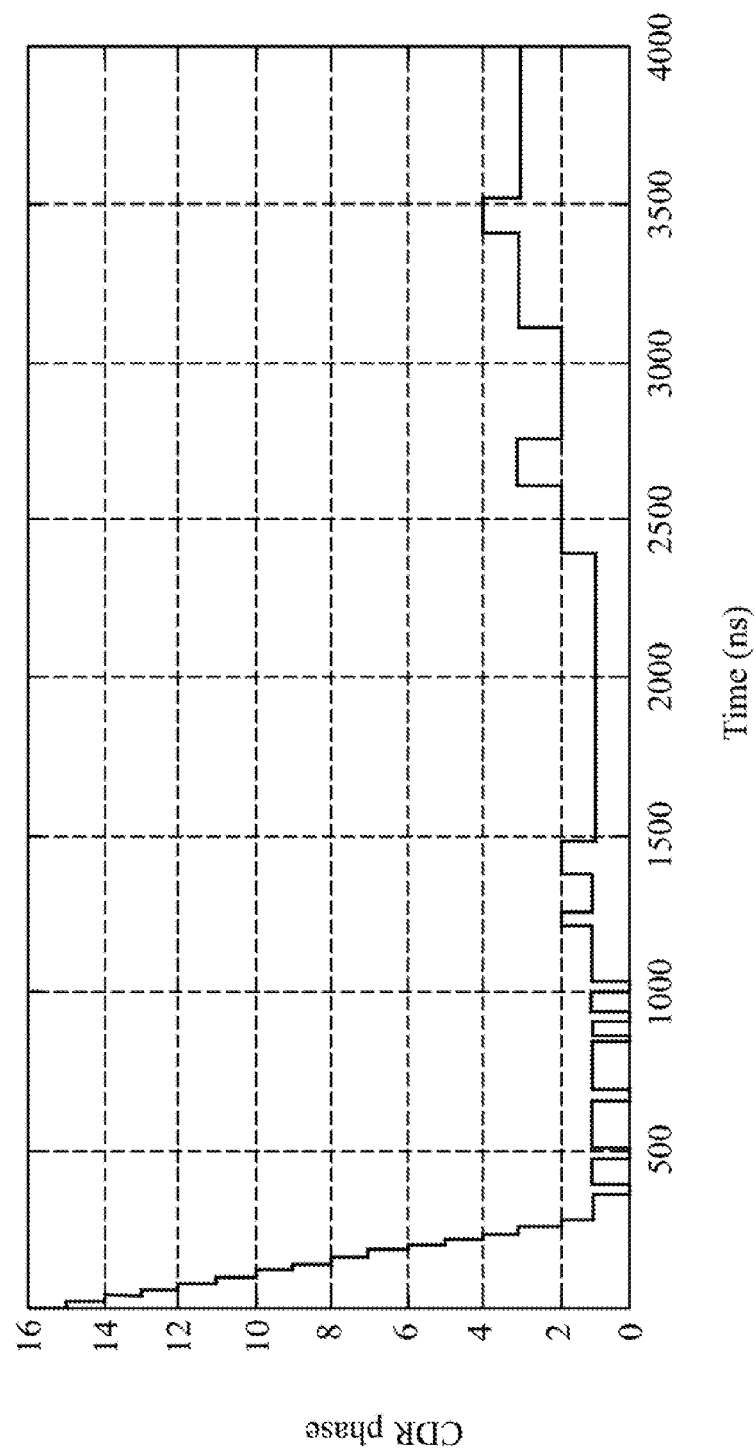
FIG. 4B schematically shows the CDR phase of the apparatus in FIG. 1 versus time.

FIGS. 4A and 4B schematically show the greatest equalizer coefficient (i.e., the equalizer coefficient $h_1$ that is closest to a main cursor of the superposed signal $S_Y$ among the equalizer coefficients $h_1$-$h_N$) and the CDR phase of the apparatus 100 versus time. As shown in FIGS. 4A and 4B, the CDR phase of the apparatus 100 changes in correspondence with the equalizer coefficient $h_1$; that is, the CDR phase of the apparatus 100 couples with the equalizer coefficient $h_1$. Therefore, the equalizer coefficient $h_1$ significantly affects the CDR phase of the apparatus 100.

Figure 5:
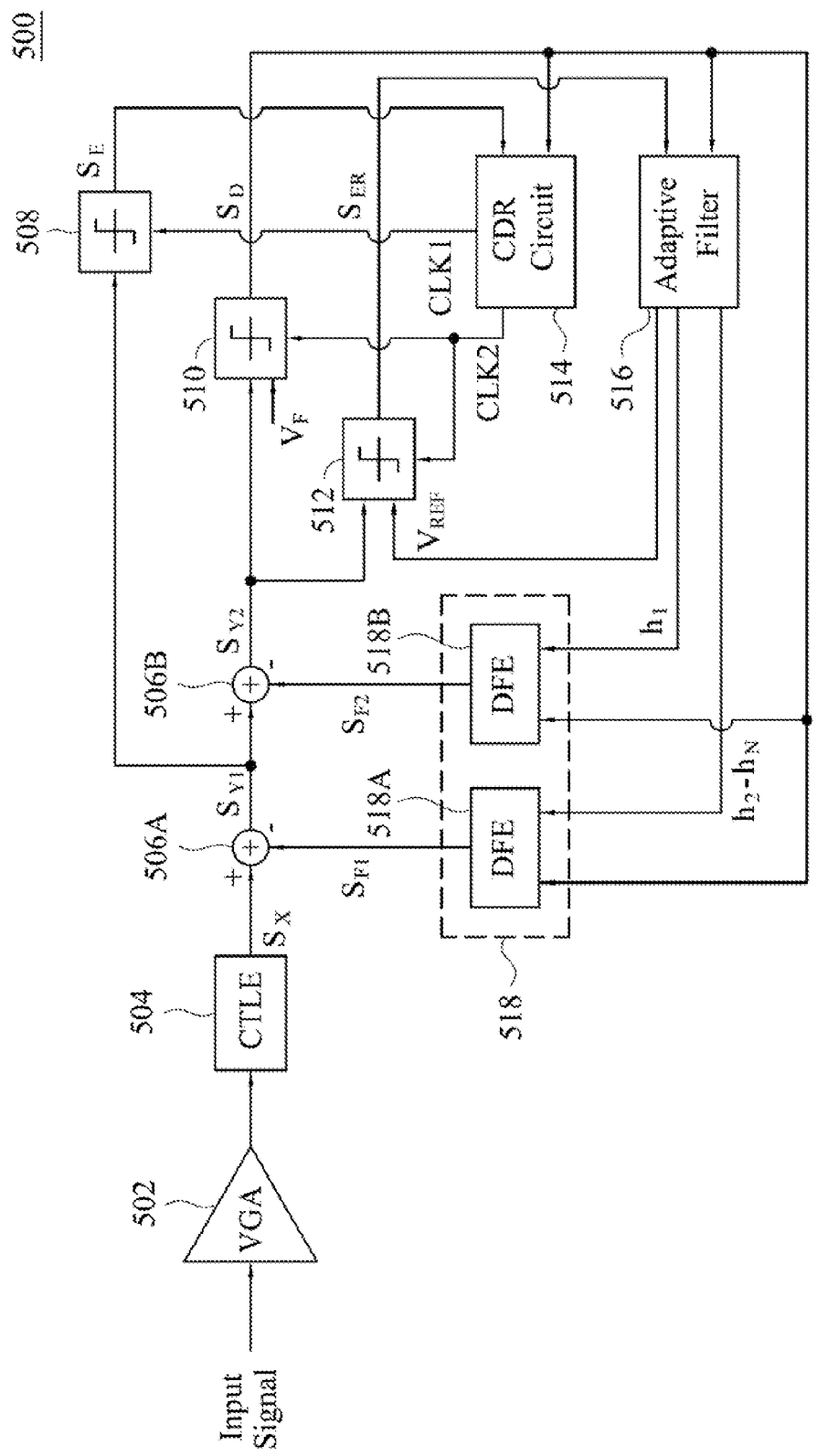
FIG. 5 is a schematic circuit diagram illustrating an apparatus for clock and data recovery in according with some embodiments of the present invention.

Referring to FIG. 5, FIG. 5 is a schematic circuit diagram illustrating an apparatus 500 for clock and data recovery in according with some embodiments of the present invention. As shown in FIG. 5, the apparatus 500 includes a VGA 502, a CTLE 504, two adders 506A and 506B, an edge slicer 508, a data slicer 510, an error slicer 512, a CDR circuit 514, an adaptive filter 516 and an equalizing unit 518.

The VGA 502 is configured to receive and amplify an input signal from a transmission channel. The CTLE 504 is coupled to the output of the VGA 502 and is configured to equalize the input signal. In particular, the VGA 502 amplifies the input signal according to a gain factor that is variable, and the CTLE 504 is configured to increase the magnitude of the high-frequency components of the input signal.

The adder 506A is coupled to the output of the CTLE 504 and the equalizing unit 518, which is configured to generate a superposed signal $S_{Y1}$ in response to a first feedback equalization signal $S_{F1}$ generated from the equalizing unit 518 and the equalized input signal $S_X$ generated from the CTLE 504. The adder 506A includes a positive input, a negative input and an output, where the positive input is configured to receive the input signal $S_X$, and the negative input is configured to receive the first feedback equalization signal $S_{F1}$. The adder 506A generates and outputs the superposed signal $S_{Y1}$ by subtracting the first feedback equalization signal $S_{F1}$ from the input signal $S_X$.

The adder 506B is coupled to the output of the adder 506A and the equalizing unit 518, which is configured to generate a superposed signal $S_{Y2}$ in response to a second feedback equalization signal $S_{F2}$ generated from the equalizing unit 518 and the superposed signal $S_{Y1}$ generated from the adder 506A. The adder 506B includes a positive input, a negative input and an output, where the positive input is configured to receive the superposed signal $S_{Y1}$, and the negative input is configured to receive the second feedback equalization signal $S_{F2}$. The adder 506B generates and outputs the superposed signal $S_{Y2}$ by subtracting the second feedback equalization signal $S_{F2}$ from the superposed signal $S_{Y1}$.

The edge slicer 508 is coupled to the output of the adder 506A and is configured to generate an edge signal $S_E$ by slicing the superposed signal $S_{Y1}$ according to a first clock signal CLK1. The edge slicer 508 detects edges of the superposed signal $S_{Y1}$ and samples the superposed signal $S_{Y1}$ at the transition timing of the first clock signal CLK1 so as to generate the edge signal $S_E$.

The data slicer 510 is coupled to the output of the adder 506B and is configured to generate a data signal $S_D$ by slicing the superposed signal $S_{Y2}$ according to a second clock signal CLK2 and a fixed reference signal $V_F$ (e.g. 0V). The data slicer 510 samples the superposed signal $S_{Y2}$, determines logic values of samples, and generates the data signal $S_D$ accordingly. For illustration, the data slicer 510 compares whether each sample of the superposed signal $S_{Y2}$ is greater than a middle level. If the sample of the superposed signal $S_{Y2}$ is greater than the middle level, the data slicer 510 sets the sample of the superposed signal $S_{Y2}$ equal to logic 1; otherwise, the data slicer 510 sets the sample of the superposed signal $S_{Y2}$ equal to logic 0.

The error slicer 512 is coupled to the output of the adder 506B and is configured to generate an error signal $S_{ER}$ by slicing the superposed signal $S_{Y2}$ according to the second clock signal CLK2 and a reference signal $V_{REF}$. For illustration, if a sample of the superposed signal $S_{Y2}$ is determined to be logic 1, the error slicer 512 sets the sample of the superposed signal $S_{Y2}$ equal to +1 or −1 to reflect whether the sample of the superposed signal $S_{Y2}$ is greater or less than the level of the reference signal $V_{REF}$.

The CDR circuit 514 is coupled to the edge slicer 508 and the data slicer 510 and is configured to generate the first clock signal CLK1 and the second clock signal CLK2 in response to the data signal $S_D$ and the edge signal $S_E$. The CDR circuit 514 may include a bang-bang phase detector configured to receive the data signal $S_D$ and the edge signal $S_E$ and generate phase update information for correspondingly adjusting the first clock signal CLK1 and the second clock signal CLK2.

The adaptive filter 516 is coupled to the data slicer 510 and the error slicer 512 and is configured to generate the reference signal $V_{REF}$ and a set of equalizer coefficients $h_1$-$h_N$ in response to the data signal $S_D$ and the error signal $S_{ER}$. The adaptive filter 516 may be implemented as a number of adaptation loops configured to determine the equalizer coefficients $h_1$-$h_N$, where N is the total number of the equalizer coefficients $h_1$-$h_N$. The equalizer coefficient $h_1$ is closest to a main cursor of the superposed signal $S_{Y2}$ among the equalizer coefficients $h_1$-$h_N$ and is greater than each of the equalizer coefficients $h_2$-$h_N$. The number of the equalizer coefficients $h_1$-$h_N$ may be set in accordance with various design requirements such as trade-off between performance and complexity. In addition, the adaptive filter 516 may dynamically adjust the reference signal $V_{REF}$ and the equalizer coefficients $h_1$-$h_N$. In some embodiments, the adaptive filter 516 is a LMS based adaptive filter for configuring the equalizer coefficients $h_1$-$h_N$ from balances derived from the data signal $S_D$ and the error signal $S_{ER}$ by utilizing an LMS algorithm.

The equalizing unit 518 is coupled to the data slicer 510 and the adaptive filter 516 and is configured to generate the first feedback equalization signal $S_{F1}$ in response to the data signal $S_D$ and the equalizer coefficients $h_2$-$h_N$ and to generate the second feedback equalization signal $S_{F2}$ in response to the data signal $S_D$ and the equalizer coefficient $h_1$, in order to annihilate post-cursor of the input signal $S_X$. As shown in FIG. 5, the equalizing unit 518 includes two DFEs 518A and 518B. The DFE 518A receives the equalizer coefficients $h_2$-$h_N$, whereas the DFE 518B receives the equalizer coefficient $h_1$. In alternative embodiments, the equalizing unit 518 includes a single DFE for generating the first feedback equalization signal $S_{F1}$ in response to the data signal $S_D$ and the equalizer coefficients $h_2$-$h_N$ and generating the second feedback equalization signal $S_{F2}$ in response to the data signal $S_D$ and the equalizer coefficient $h_1$.

The relationship between the feedback equalization signal $S_{F1}$, the data signal $S_D$ and the equalizer coefficients $h_2$-$h_N$ is expressed as Equation (3):

$$S_{F1}[k] = \sum_{i=1}^{N-1} h_{i+1} \cdot S_D[k-i-1], \tag{3}$$

and the relationship between the feedback equalization signal $S_{F2}$, the data signal $S_D$ and the equalizer coefficients $h_1$ is expressed as Equation (4):

$$S_{F2}[k] = h_1 \cdot S_D[k-1], \tag{4}$$

where [k−1] denotes the first delayed sample of the signal $S_D[k]$. Therefore, the relationship between the superposed signal $S_{Y1}$, the feedback equalization signal $S_{F1}$ and the input signal $S_X$ is expressed as Equation (5):

$$S_{Y1}[k] = S_X[k] - S_{F1}[k] = S_X[k] - \sum_{i=1}^{N-1} h_{i+1} \cdot S_D[k-i-1], \tag{5}$$

and the relationship between the superposed signals $S_{Y1}$ and $S_{Y2}$ and the feedback equalization signal $S_{F2}$ is expressed as Equation (6):

$$S_{Y2}[k] = S_{Y1}[k] - S_{F2}[k] = S_X[k] - \sum_{i=1}^{N} h_i \cdot S_D[k-i]. \tag{6}$$

Figure 6:
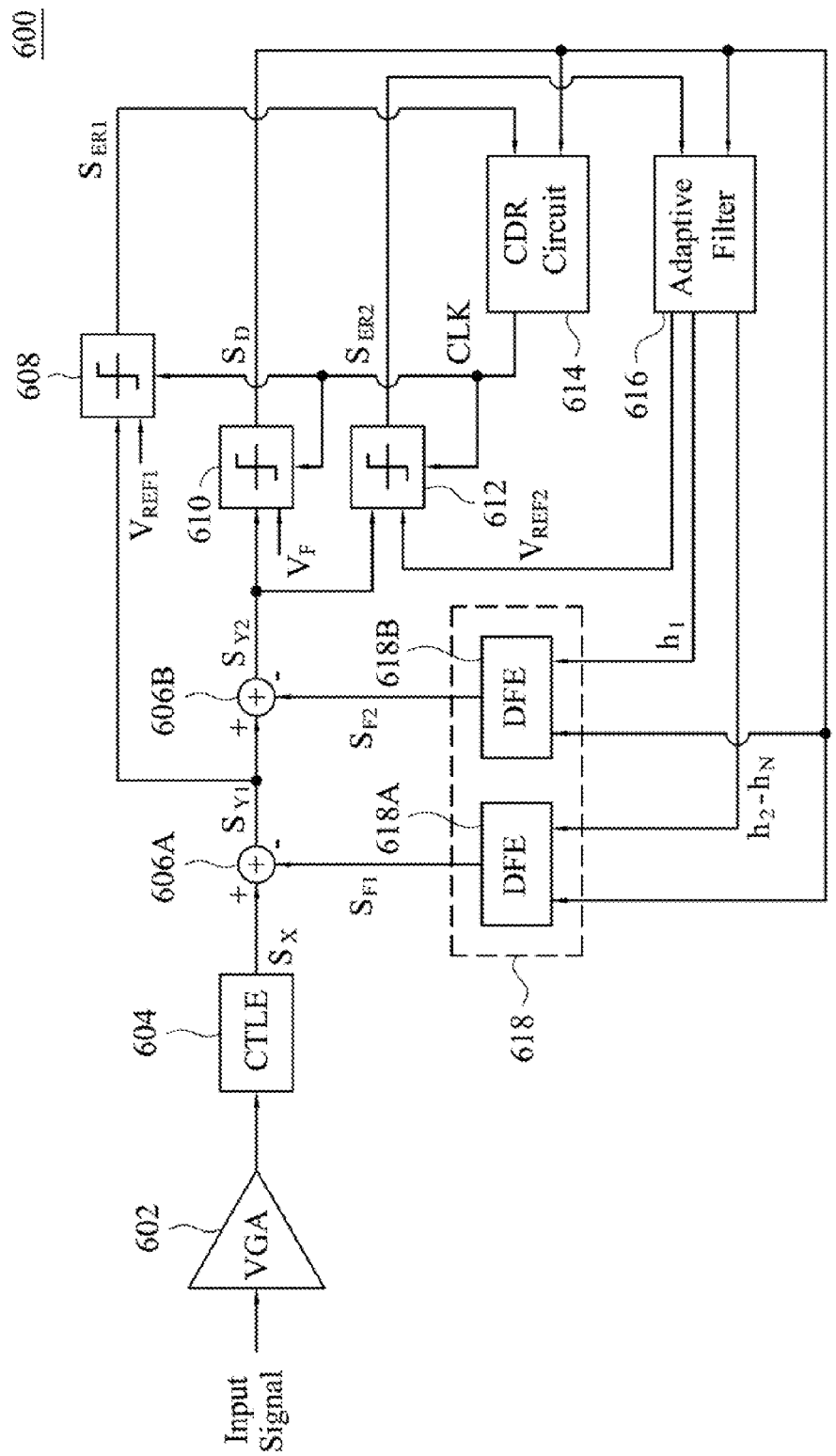
FIG. 6 is a schematic circuit diagram illustrating an apparatus for clock and data recovery in according with some embodiments of the present invention.

Alternatively, phase error estimation for clock and data recovery may be performed by a Mueller-Muller phase detector. Referring to FIG. 6, FIG. 6 is a schematic circuit diagram illustrating an apparatus 600 for clock and data recovery in according with some embodiments of the present invention. As shown in FIG. 6, the apparatus 600 includes a VGA 602, a CTLE 604, two adders 606A and 606B, two error slicers 608 and 612, a data slicer 610, a CDR circuit 614, an adaptive filter 616 and an equalizing unit 618.

The VGA 602 is configured to receive and amplify an input signal from a transmission channel. In particular, the VGA 602 amplifies the input signal according to a gain factor that is variable. The CTLE 604 is coupled to the output of the VGA 602 and is configured to equalize the input signal. In particular, the CTLE 604 is configured to increase the magnitude of the high-frequency components of the input signal The adder 606A is coupled to the output of the CTLE 604 and the equalizing unit 618, which is configured to generate a superposed signal $S_{Y1}$ in response to a first feedback equalization signal $S_{F1}$ generated from the equalizing unit 618 and the equalized input signal $S_X$ generated from the CTLE 604. The adder 606A includes a positive input, a negative input and an output, where the positive input is configured to receive the input signal $S_X$, and the negative input is configured to receive the first feedback equalization signal $S_{F1}$. The adder 606A generates and outputs the superposed signal $S_{Y1}$ by subtracting the first feedback equalization signal $S_{F1}$ from the input signal $S_X$.

The adder 606B is coupled to the output of the adder 606A and the equalizing unit 618, which is configured to generate a superposed signal $S_{Y2}$ in response to a second feedback equalization signal $S_{F2}$ generated from the equalizing unit 618 and the superposed signal $S_{Y1}$ generated from the adder 606A. The adder 606B includes a positive input, a negative input and an output, where the positive input is configured to receive the superposed signal $S_{Y1}$, and the negative input is configured to receive the second feedback equalization signal $S_{F2}$. The adder 606B generates and outputs the superposed signal $S_{Y2}$ by subtracting the second feedback equalization signal $S_{F2}$ from the superposed signal $S_{Y1}$.

The error slicer 608 is coupled to the output of the adder 606A and is configured to generate an error signal $S_{ER1}$ by slicing the superposed signal $S_{Y1}$ according to a clock signal CLK and a reference signal $V_{REF1}$. For illustration, if a sample of the superposed signal $S_{Y1}$ is determined to be logic 1, the error slicer 608 sets the sample of the superposed signal $S_{Y1}$ equal to +1 or −1 to reflect whether the sample of the superposed signal $S_{Y1}$ is greater or less than the level of the reference signal $V_{REF1}$.

The data slicer 610 is coupled to the output of the adder 606B and is configured to generate a data signal $S_D$ by slicing the superposed signal $S_{Y2}$ according to a clock signal CLK and a fixed reference signal $V_F$ (e.g. 0V). The data slicer 610 samples the superposed signal $S_{Y2}$, determines logic values of samples, and generates the data signal $S_D$ accordingly. For illustration, the data slicer 610 compares whether each sample of the superposed signal $S_{Y2}$ is greater than a middle level. If the sample of the superposed signal $S_{Y2}$ is greater than the middle level, the data slicer 610 sets the sample of the superposed signal $S_{Y2}$ equal to logic 1; otherwise, the data slicer 610 sets the sample of the superposed signal $S_{Y2}$ equal to logic 0.

The error slicer 612 is coupled to the output of the adder 606B and is configured to generate an error signal $S_{ER2}$ by slicing the superposed signal $S_{Y2}$ according to the clock signal CLK and a reference signal $V_{REF2}$. For illustration, if a sample of the superposed signal $S_{Y2}$ is determined to be logic 1, the error slicer 612 sets the sample of the superposed signal $S_{Y2}$ equal to +1 or −1 to reflect whether the sample of the superposed signal $S_{Y2}$ is greater or less than the level of the reference signal $V_{REF2}$.

The CDR circuit 614 is coupled to the error slicer 608 and the data slicer 610 and is configured to generate the clock signal CLK in response to the data signal $S_D$ and the error signal $S_{ER1}$. The CDR circuit 614 may include a bang-bang phase detector configured to receive the data signal $S_D$ and the error signal $S_{ER1}$ and generate phase update information for correspondingly adjusting the clock signal CLK.

The adaptive filter 616 is coupled to and the data slicer 610 and the error slicer 612 and is configured to generate the reference signal $V_{REF2}$ and a set of equalizer coefficients $h_1$-$h_N$ in response to the data signal $S_D$ and the error signal $S_{ER2}$. The adaptive filter 616 may be implemented as a number of adaptation loops configured to determine the equalizer coefficients $h_1$-$h_N$, where N is the total number of the equalizer coefficients $h_1$-$h_N$. The equalizer coefficient $h_1$ is closest to a main cursor of the superposed signal $S_{Y2}$ among the equalizer coefficients $h_1$-$h_N$ and is greater than each of the equalizer coefficients $h_2$-$h_N$. In addition, the adaptive filter 616 may dynamically adjust the reference signal $V_{REF2}$ and the equalizer coefficients $h_1$-$h_N$. In some embodiments, the adaptive filter 616 is a LMS based adaptive filter for configuring the equalizer coefficients $h_1$-$h_N$ from balances derived from the data signal $S_D$ and the error signal $S_{ER2}$ by utilizing an LMS algorithm.

The equalizing unit 618 is coupled to the data slicer 610 and the adaptive filter 616 and is configured to generate the first feedback equalization signal $S_{F1}$ in response to the data signal $S_D$ and the equalizer coefficients $h_2$-$h_N$ and to generate the second feedback equalization signal $S_{F2}$ in response to the data signal $S_D$ and the equalizer coefficient $h_1$, in order to annihilate post-cursor of the input signal $S_X$. As shown in FIG. 6, the equalizing unit 618 includes two DFEs 618A and 618B. In alternative embodiments, the equalizing unit 618 includes a single DFE for generating the first feedback equalization signal $S_{F1}$ in response to the data signal $S_D$ and the equalizer coefficients $h_2$-$h_N$ and generating the second feedback equalization signal $S_{F2}$ in response to the data signal $S_D$ and the equalizer coefficient $h_1$. The relationship between the superposed signal $S_{Y1}$, the first feedback equalization signal $S_{F1}$ and the input signal $S_X$ is expressed as Equation (5), and the relationship between the superposed signals $S_{Y1}$ and $S_{Y2}$ and the second feedback equalization signal $S_{F2}$ is expressed as Equation (6).

Figure 7A:
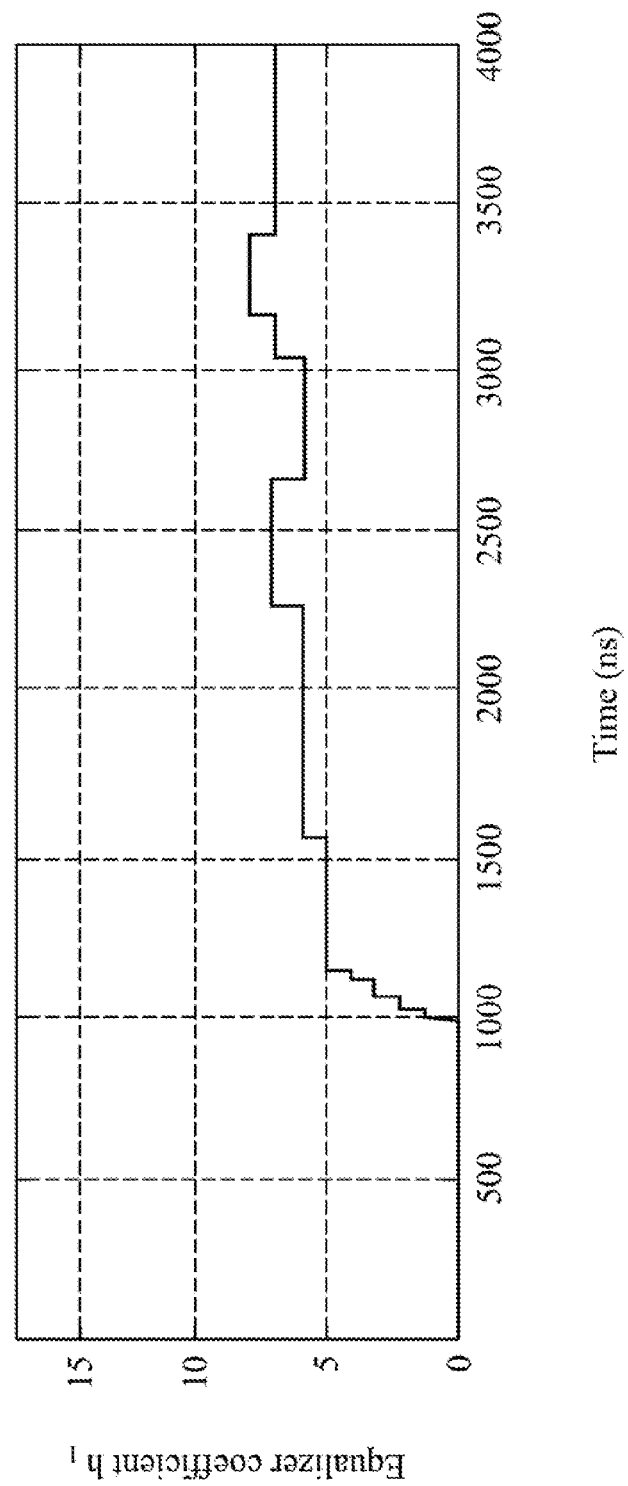
FIG. 7A schematically shows the greatest equalizer coefficient of the apparatus in FIG. 5 versus time.
Figure 7B:
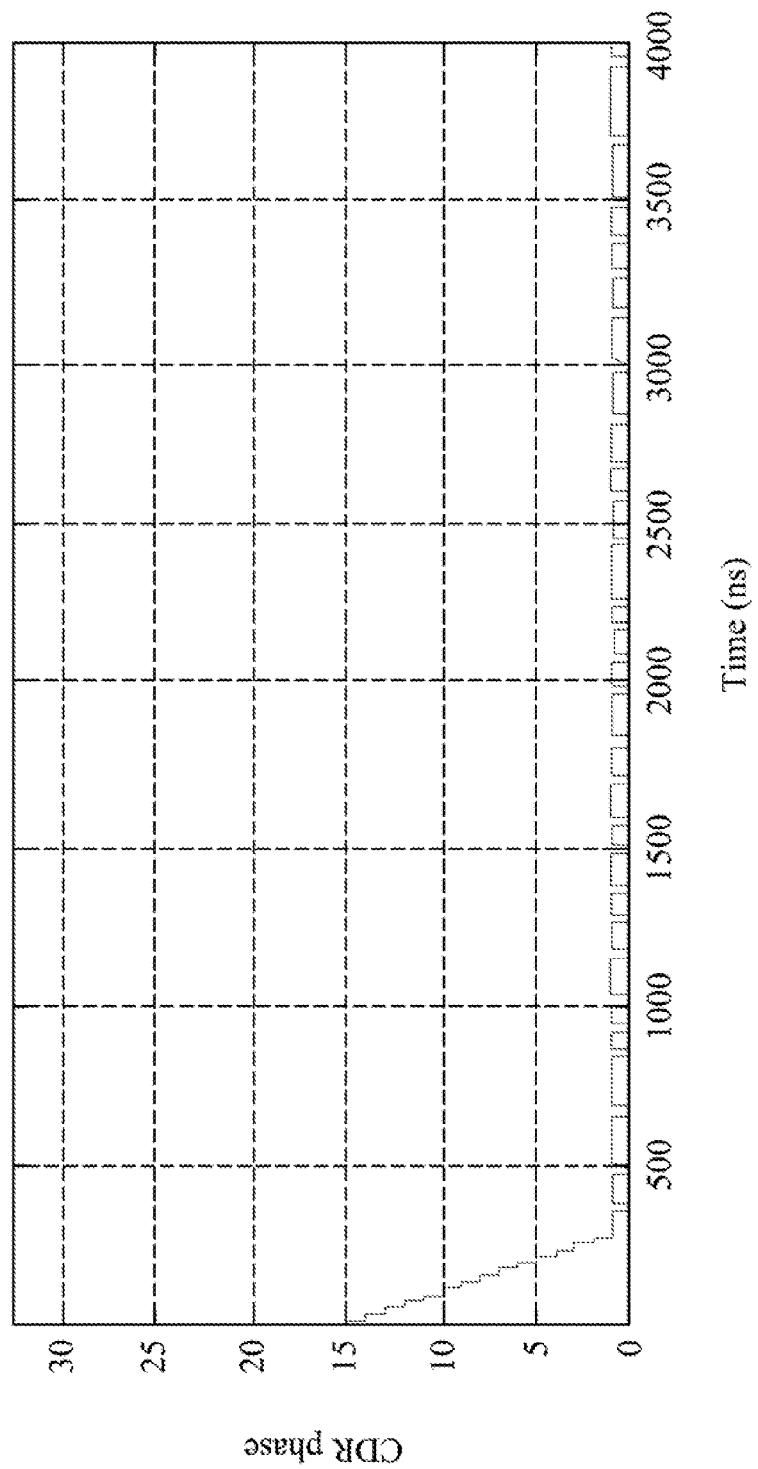
FIG. 7B schematically shows the CDR phase of the apparatus in FIG. 5 versus time.

FIGS. 7A and 7B schematically show the greatest equalizer coefficient (i.e., the equalizer coefficient $h_1$ that is closest to a main cursor of the superposed signal $S_{Y2}$ among the equalizer coefficients $h_1$-$h_N$) and the CDR phase of the apparatus 500 versus time. As shown in FIGS. 7A and 7B, the CDR phase of the apparatus 100 remains at 0 or 1, regardless of whether the equalizer coefficient $h_1$ changes. Compared to the apparatus 100 in FIG. 1, the apparatus 500 provides less CDR phase without being impacted by the greatest equalizer coefficient.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:

1. An apparatus, comprising:
    a first adder configured to generate a first superposed signal in response to a first feedback equalization signal and an input signal;
    a second adder configured to generate a second superposed signal in response to a second feedback equalization signal and the first superposed signal;
    an edge slicer configured to generate an edge signal by slicing the first superposed signal according to a first clock signal;
    a data slicer configured to generate a data signal by slicing the second superposed signal according to a second clock signal;
    an error slicer configured to generate an error signal by slicing the second superposed signal according to the second clock signal and a reference signal;
    a clock and data recovery (CDR) circuit configured to generate the first clock signal and the second clock signal in response to the data signal and the edge signal;
    an adaptive filter configured to generate the reference signal and a set of equalizer coefficients in response to the data signal and the error signal; and
    an equalizing unit configured to generate the first feedback equalization signal and the second feedback equalization signal in response to the data signal and the set of equalizer coefficients.

2. The apparatus of claim 1, wherein the equalizing unit is a decision feedback equalizer (DFE).

3. The apparatus of claim 1, wherein the set of equalizer coefficients comprises a plurality of first equalizer coefficients and a second equalizer coefficient, wherein the first equalizer coefficients are associated with the first feedback equalization signal, and the second equalizer coefficient is associated with the second feedback equalization signal.

4. The apparatus of claim 3, wherein the second equalizer coefficient is closest to a main cursor of the second superposed signal among the set of equalizer coefficients and is greater than each of the first equalizer coefficients.

5. The apparatus of claim 3, wherein the equalizing unit comprises a first DFE and a second DFE, wherein the first DFE is configured to generate the first feedback equalization signal in response to the data signal and the first equalizer coefficients, and the second DFE is configured to generate the second feedback equalization signal in response to the data signal and the second equalizer coefficient.

6. The apparatus of claim 1, wherein the first clock signal and the second clock signal are substantially inverted.

7. The apparatus of claim 1, further comprising a continuous time linear equalizer (CTLE) coupled to the first adder for equalizing the input signal received from a transmission channel.

8. The apparatus of claim 1, wherein the adaptive filter is configured to dynamically adjust the set of equalizer coefficients in response to the data signal and the error signal.

9. The apparatus of claim 1, wherein the CDR circuit comprises a bang-bang phase detector, wherein the bang-bang phase detector is configured to generate a phase update information in response to the data signal and the edge signal, and phases of the first clock signal and the second clock signal are correspondingly adjusted in response to the phase update information.

10. The apparatus of claim 1, wherein the adaptive filter is a least mean square (LMS) based adaptive filter.

11. An apparatus, comprising:
    a first adder configured to generate a first superposed signal in response to a first feedback equalization signal and an input signal;
    a second adder configured to generate a second superposed signal in response to a second feedback equalization signal and the first superposed signal;
    a first error slicer configured to generate a first error signal by slicing the first superposed signal in response to a clock signal and a first reference signal;
    a data slicer configured to generate a data signal by slicing the second superposed signal according to the clock signal;
    a second error slicer configured to generate a second error signal by slicing the second superposed signal according to the clock signal and a second reference signal;
    a clock and data recovery (CDR) circuit configured to generate the clock signal in response to the data signal and the first error signal;
    an adaptive filter configured to generate the second reference signal and a set of equalizer coefficients in response to data signal and the second error signal; and
    an equalizing unit configured to generate the first feedback equalization signal and the second feedback equalization signal in response to the data signal and the set of equalizer coefficients.

12. The apparatus of claim 11, wherein the equalizing unit is a decision feedback equalizer (DFE).

13. The apparatus of claim 11, wherein the set of equalizer coefficients comprises a plurality of first equalizer coefficients and a second equalizer coefficient, wherein the first equalizer coefficients are associated with the first feedback equalization signal, and the second equalizer coefficient is associated with the second feedback equalization signal.

14. The apparatus of claim 13, wherein the second equalizer coefficient is closest to a main cursor of the second superposed signal among the set of equalizer coefficients and is greater than each of the first equalizer coefficients.

15. The apparatus of claim 13, wherein the equalizing unit comprises a first DFE and a second DFE, wherein the first DFE is configured to generate the first feedback equalization signal in response to the data signal and the first equalizer coefficients, and the second DFE is configured to generate the second feedback equalization signal in response to the data signal and the second equalizer coefficient.

16. The apparatus of claim 11, further comprising a continuous time linear equalizer (CTLE) coupled to the first adder for equalizing the input signal received from a transmission channel.

17. The apparatus of claim 11, wherein the adaptive filter is configured to dynamically adjust the second reference signal in response to data signal and the second error signal.

18. The apparatus of claim 11, wherein the adaptive filter is configured to dynamically adjust the set of equalizer coefficients in response to the data signal and the second error signal.

19. The apparatus of claim 11, wherein the CDR circuit comprises a Mueller-Muller phase detector, wherein the Mueller-Muller phase detector is configured to generate a phase update information in response to the data signal and the first error signal, and a phase of the clock signal is correspondingly adjusted in response to the phase update information.

20. The apparatus of claim 11, wherein the adaptive filter is a least mean square (LMS) based adaptive filter.

* * * * *